July 5, 1966  E. A. SIEMSSEN  3,259,171

METHOD AND APPARATUS FOR PARTICLE FORMING AND SPRAY DRYING

Filed Jan. 15, 1964

INVENTOR.
ERNST A. SIEMSSEN

BY *E. Walleford Mason*

ATTORNEY.

3,259,171
METHOD AND APPARATUS FOR PARTICLE FORMING AND SPRAY DRYING
Ernst A. Siemssen, Norristown, Pa., assignor to Selas Corporation of America, a corporation of Pennsylvania
Filed Jan. 15, 1964, Ser. No. 337,887
8 Claims. (Cl. 159—4)

The present invention relates to the manufacture and collection of small particles of a clay-like material that is useful as feed stock in the preparation of light weight aggregate and the like.

Processes and apparatus have been developed for bloating and fusing clay particles and the like for use as aggregate in the manufacture of various ceramic and refractory products. In order for the apparatus to produce a uniform product, it is necessary that the feed particles be of substantially the same size and shape. In addition, since the above mentioned processes are continuous, it is necessary to have and to maintain a large supply of these particles available for use. Production of suitable feed particles in large quantities has been difficult.

It is an object of the invention to provide a method and apparatus to make and collect small clay particles of substantially the same size and shape. It is a further object of the invention to make said particles in large quantities on a continual basis, and collect them for use in a fusing furnace.

In practicing the invention, there is provided a circular building, in the center of which is located a "slinger" that is used to form the particles. As they move outwardly from the slinger, their movement is retarded, and they are substantially dried by a sheet or blanket of warm air that is moving counter to the movement of the particles. As the particles drop, they are collected on a suitable collection apparatus, ready for use as feed stock.

While the description is centered around the production of particles made of clay, it will be apparent that the invention is equally as applicable to the manufacture of particles of other materials that can be extruded and the term clay should be so considered.

The various features of novelty which characterize my invention are pointed out with particularly in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

Figure 1:
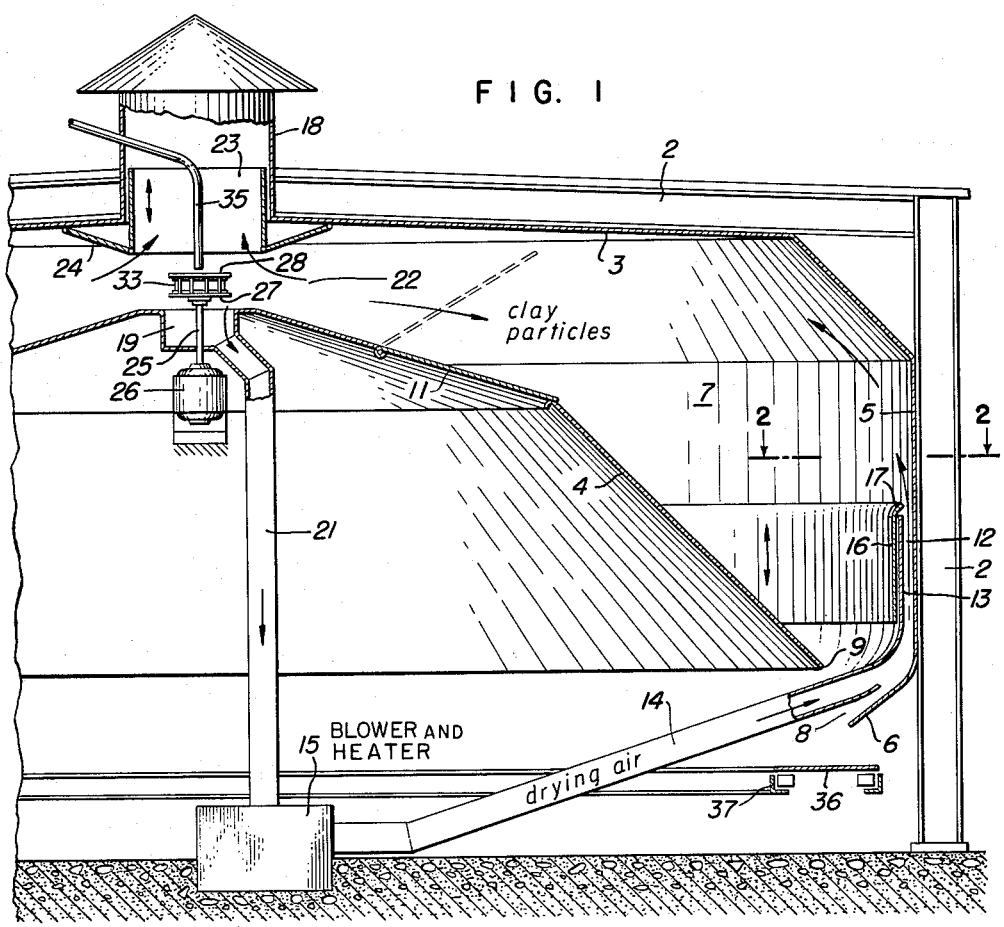
Figure 3:
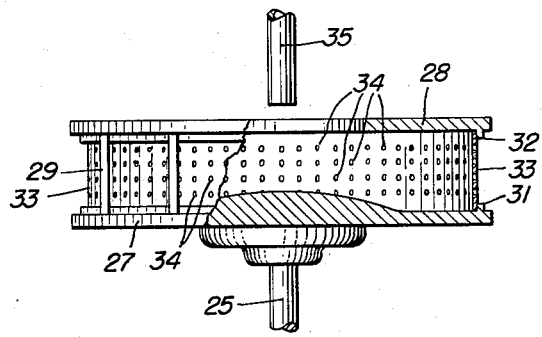
Figure 2:
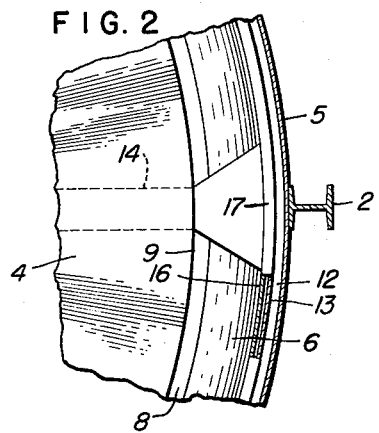

In the drawings:
FIG. 1 is a section through a portion of the apparatus,
FIG. 2 is a partial plan view taken on line 2—2 of FIG. 1, and
FIG. 3 is an enlarged view of the slinger head.

The apparatus includes an annular housing which is supported by suitable structural steel 2. The housing is made of any suitable material but is preferably of sheet metal that can be cut to shape and fabricated with ease. The housing includes a top 3, a bottom 4 and an outer cylindrical side wall 5, the lower edge 6 of which is directed radially inwardly. These walls form an annular chamber 7 through which the particles travel as they are formed, dried and collected in a manner set forth in detail below. The chamber is provided with an annular outlet 8 between the lower edge 9 of the floor 4 and the inturned portion 6 of the side wall 5. It is noted that the floor 4 is provided with several hinged sections 11 that can be lifted so that the interior of the chamber can be inspected. In effect, the chamber has a disc-like space between top 3 and sections 11, and an annular space adjacent to side wall 5.

During the times that the particles are being made, air is circulated through the housing for the purpose of braking the travel of the particles and for helping the particles to dry as they are traveling through their trajectory. To this end, air is supplied to an annular manifold 12 which is formed around the lower portion of side wall 5 by a plate 13 that extends completely around the chamber. Air is supplied to this manifold through an air supply pipe 14 from a heater and blower which is indicated diagrammatically at 15. The height of the manifold and, therefore, the location along the wall 5 at which the air can be discharged, can be adjusted by means of a plate 16 which telescopes over the outer wall 13 of the manifold. This plate can be raised and lowered to change the location of its upper edge 17, which forms the exit from the manifold. Air is exhausted from the center of the chamber through a vent 18, and a portion of the air can be recirculated by being drawn through an annular opening 19 and pipe 21 to the supply 15. The velocity of the exhaust air which passes through what is, in effect, a throat 22, toward the center of the chamber, can be varied by changing the height of this throat. This is accomplished by moving a sleeve 23, that is telescoped in vent 18, in a vertical direction. In order to insure that the air will flow smoothly around the lower end of sleeve 23, there is provided an annular cone 24 made of overlapping segments hinged at their inner edges to the lower end of the sleeve and at their outer edges slidable along the top 3.

The slinger by which the particles are formed is mounted for rotation on a shaft 5 that extends vertically at the axis of chamber 7. The shaft is rotated by a motor 26 that can be mounted in any suitable fashion. The slinger is in the form of a cylindrical chamber formed of a metal housing consisting of a lower disc 27 and an upper disc 28 having a central opening, with the discs being joined by vertical posts 29. The discs are each provided with inwardly extending shoulders 31 against which a circular screen 33 rests. This screen is provided with a multiplicity of openings 34 through which the clay is extruded. Clay of a suitable consistency is discharged through a pipe 35 into the chamber formed by the slinger head in order to be moved outwardly by centrifugal force through openings 34.

In the operation of the apparatus, clay, or similar material, is mixed with about 30% by weight of water to form a plastic mass having the consistency of dough. This mass is forced through pipe 35 and discharged into the slinger head. The plastic mass is moved outwardly or extruded by centrifugal force through openings 34 of the screen 33 as rods. Almost immediately, however, these rods are broken into small particles of substantially the same size and shape which move outwardly into chamber 7 in a trajectory that depends upon the speed of rotation of the slinger. The particles will normally spread as they travel through space; some of them will fall on bottom 4 radially inward of edge 9, and others will strike wall 5, frequently before they are dry. In order to reduce the spread of the particles as they travel through chamber 7, the spinner is rotated at such a speed that the majority of particles will move at a velocity sufficient to strike outer wall 5. Since the particles are moist, they will stick to each other and form a mass of material unless some way is provided to slow them down and dry them as they are moving outwardly. This is the purpose of the air discharged as a curtain upwardly along wall 5.

Air from blower-heater 15 is discharged through duct 14 to manifold 12 at a temperature of about 250° F. The air is supplied in sufficient volume so that it flows upwardly along and around wall 5 past edge 17 with a velocity of about 40 feet per second. The air travels in opposition to the travel of the particles and acts simultaneously to brake the travel of the particles and to dry them. The location at which the air curtain begins to move up wall 5 can be adjusted for optimum results by moving plate 16 along wall 13 of the manifold. Consequently the particles will be braked and will not strike wall 5, but will fall freely and as individual dry particles to the bottom of chamber 7. As they pass through annular outlet 8, they will be directed by portion 6 of wall 5 onto a circular belt 36. This belt is supported by and moved upon suitable members 37 past a scraper, not shown, to remove the particles from the belt for use or storage.

The size of the particles produced will vary with the size of openings 34, the speed of the slinger head and the consistency of the clay batch. Ordinarily the openings 34 will vary in size from .027″ to .032″; the speed of the slinger will vary from 1800 r.p.m. to 3200 r.p.m. and the particles will have a diameter to length ratio of from 1 to 1 to 1 to 4. With openings 34 having a diameter of .03″ and the slinger having a speed of 2500 r.p.m. and the clay being mixed with about 30% by weight of water, the particles produced will be .03″ in diameter and have a length of about .06″, depending upon the type of clay used. This can only be determined emperically.

The velocity of the air traveling in the opposite direction to the particles through portion 22 of the chamber, adjacent to the slinger, can be varied by varying the vertical dimension of portion 22. This is accomplished by sliding sleeve 23 up or down in vent 18. Such change in velocity will vary the braking effect of the air on the particles. It is noted that outlet 19 is sized so that about one quarter of the air will be recirculated through device 15. This saves a considerable amount of heat, but does not retain enough moisture in the air to have any appreciable effect on its drying ability.

It will be seen that the invention provides apparatus for making, on a continuous basis, small particles of clay or a similar material that can be extruded. The particles are of substantially the same size and shape, and they are dryed during their travel from the forming device with the drying air serving to brake their travel before they can strike the wall of the housing. The dry particles flow freely from the bottom of the housing onto a collecting belt.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of making and collecting small particles of a clay-like material which comprises,
    moving moist, plastic clay-like material outwardly as cylinders from an axis of the action of centrifugal force into a disc-like space and then into an annular space having an outer wall,
    thereby breaking the cylinders into small particles of substantially the same size and shape as they are moving, the particles following a substantially uniform trajectory as they are traveling through space toward the wall,
    moving an annular curtain of warm air upwardly along the wall around the periphery of the space and then radially inwardly in opposition to the travel of the particles,
    braking the radial travel of the particles in their trajectory by the flow of said rising and inwardly directed curtain of air, the air also serving to dry the particles, removing the spent air and moisture axially of the disc-like space, and
    collecting the particles at an annular location at the bottom of the space.

2. The method of forming and collecting small particles of a clay-like material which comprises mixing the material with liquid to form a plastic mass, moving said mass outwardly by centrifugal force as cylinders from an axis into a substantially circular space having an outer wall, thereby breaking the cylinders into particles by the action of said centrifugal force as they are moving, the particles traveling in a trajectory toward said wall, moving an annular curtain of air up said wall from a point below which said particles would normally strike the wall and inwardly in opposition to their path of travel to slow the speed of the particles and to shorten the trajectory of the particles, removing the spent air and the moisture axially of the space, and collecting the particles in a circle adjacent to the bottom of the wall.

3. The method of claim 2 in which said curtain of air is heated to drive the moisture from the particles as they are moving.

4. The method of claim 2 including the step of varying the velocity of the air moving toward the center of said space thereby to vary the braking effect of the air on the particles.

5. The method of claim 2 including recirculating a portion of the air by using it as a portion of said curtain of air.

6. The method of making and collecting small particles of a clay-like material which comprises
    moving moist plastic clay-like material outwardly from an axis into a confined annular space through a multiplicity of small orifices that shape the material into cylinders by the extruding action of centrifugal force,
    thereby breaking the cylinders into small particles of substantially uniform size and shape after the cylinders have passed through the orifices, the particles moving radially through a predetermined trajectory in said space,
    moving an annular blanket of warm air first upwardly along the periphery and then radially inwardly of the space, the air moving counter-current first to the falling particles and then to the particles as they approach the periphery of the space, the air serving to brake the travel of the particles and thereby reduce the distance they travel and also serving to dry the particles, removing air and vapor axially of the space and
    collecting the dry particles at an annular location below the point where they are contacted by the blanket of air.

7. Apparatus for producing small clay-like particles comprising a substantially annular structure having a vertical outer wall and an annular slot at the bottom thereof, means forming an annular duct extending interiorly around said wall adjacent to the lower portion thereof, said duct having an annular outlet extending and discharging upwardly along said wall, air outlet means at the axial part of the structure, a rotatable shaft extending vertically at the axis of said structure, means forming a cylindrical chamber having an exterior wall, said wall being provided with a multitude of perforations, means to mount said chamber on said shaft adjacent to the top of said structure, means to supply material to be made into particles to said chamber, means to rotate said shaft thereby to force material through said perforations by centrifugal force, said material breaking into small particles that move outwardly toward said wall, means to force air into said duct and through said outlet to flow as a sheet upwardly along said wall and then radially inwardly toward the air outlet to retard the travel of said particles, and beneath said annular slot means to collect said particles at the bottom of said structure.

8. The combination of claim 7, said outlet means including means at the center of said structure through which a portion of the air can be withdrawn for recirculation through said annular duct.

References Cited by the Examiner

UNITED STATES PATENTS

| | | | |
|---|---|---|---|
| 1,374,555 | 4/1921 | Dick | 159—4 X |
| 1,432,635 | 10/1922 | Stevens | 159—4 X |
| 1,450,840 | 4/1923 | Dick | 159—4 |
| 2,357,649 | 9/1944 | Hall | 159—4 |
| 2,833,345 | 5/1958 | Van der Pyl | 159—4 |

FOREIGN PATENTS 264,992 10/1913 Germany.
341,751 10/1921 Germany.

NORMAN YUDKOFF, *Primary Examiner.*

J. SOFER, *Assistant Examiner.*